United States Patent
Mu

(10) Patent No.: US 9,634,705 B2
(45) Date of Patent: Apr. 25, 2017

(54) RADIO RECEIVER CIRCUIT, COMMUNICATION APPARATUS, AND ADAPTATION METHOD

(71) Applicant: Telefonaktiebolaget LM Ericsson (publ), Stockholm (SE)

(72) Inventor: Fenghao Mu, Hjarup (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/912,091

(22) PCT Filed: Aug. 16, 2013

(86) PCT No.: PCT/EP2013/067136
§ 371 (c)(1),
(2) Date: Feb. 14, 2016

(87) PCT Pub. No.: WO2015/022031
PCT Pub. Date: Feb. 19, 2015

(65) Prior Publication Data
US 2016/0204813 A1   Jul. 14, 2016

(51) Int. Cl.
*H04B 1/16* (2006.01)
*H04B 1/18* (2006.01)
(Continued)

(52) U.S. Cl.
CPC .............. *H04B 1/1615* (2013.01); *H04B 1/06* (2013.01); *H04B 1/1036* (2013.01); *H04B 1/18* (2013.01); *H04W 52/0283* (2013.01)

(58) Field of Classification Search
CPC .......... H04B 1/06; H04B 1/1036; H04B 1/16; H04B 1/1676
(Continued)

(56) References Cited

U.S. PATENT DOCUMENTS

| | | | |
|---|---|---|---|
| 8,811,924 B2 * | 8/2014 | Rueckriem | H04B 7/082 455/140 |
| 2004/0106441 A1 | 6/2004 | Kazakevich et al. | |

(Continued)

OTHER PUBLICATIONS

PCT International Search Report, mailed Apr. 2, 2014, in connection with International Application No. PCT/EP2013/067136, all pages.

(Continued)

*Primary Examiner* — Tuan Pham
(74) *Attorney, Agent, or Firm* — Leffler Intellectual Property Law, PLLC

(57) ABSTRACT

A receiver circuit comprising a transformer arrangement comprising a transformer structure, multiple and distributed receiver units arranged to be connected to one and same antenna via the transformer arrangement and arranged to operate on the same frequency and bandwidth as each other, wherein the transformer arrangement is arranged to input the antenna signal and to output signals at different output ports for the respective receiver unit, and a combiner circuit arranged to combine outputs of the multiple receiver units such that the combiner circuit outputs a combined signal, and corresponding communication apparatus, method and computer program are disclosed.

21 Claims, 9 Drawing Sheets

(51) Int. Cl.
*H04B 1/10* (2006.01)
*H04W 52/02* (2009.01)
*H04B 1/06* (2006.01)

(58) Field of Classification Search
USPC ....... 455/130, 132, 133, 134, 135, 137, 139, 455/140, 178.1
See application file for complete search history.

(56) References Cited

U.S. PATENT DOCUMENTS

| | | | |
|---|---|---|---|
| 2004/0239443 A1 | 12/2004 | Kottschlag et al. | |
| 2008/0305736 A1* | 12/2008 | Milbrandt | H04B 7/18517 455/3.02 |
| 2010/0225400 A1* | 9/2010 | Rofougaran | H01L 23/49822 330/295 |
| 2010/0270999 A1 | 10/2010 | Lai | |
| 2013/0316668 A1* | 11/2013 | Davierwalla | H03G 3/20 455/208 |
| 2014/0213209 A1* | 7/2014 | Holenstein | H04B 1/16 455/253.2 |
| 2014/0269865 A1* | 9/2014 | Aparin | H04L 27/0002 375/222 |

OTHER PUBLICATIONS

PCT Written Opinion, mailed Apr. 2, 2014, in connection with International Application No. PCT/EP2013/067136, all pages.

* cited by examiner

RADIO RECEIVER CIRCUIT, COMMUNICATION APPARATUS, AND ADAPTATION METHOD

TECHNICAL FIELD

The present invention generally relates to a radio receiver circuit, a communication apparatus, and an adaptation method for reducing power consumption.

BACKGROUND

Mobile/portable devices in particular, but also other electronic communication devices are widely used. For proper communication, features such as high linearity and low noise are desired, and features like low power consumption and versatility are also desired, but these groups of features may often contradict each other. For instance, to reach high linearity and low noise figure often leads to large consumption of power, but in the mobile and portable devices, battery capacity in the devices is normally limited for portability reasons, which puts demands on low power design.

Supply voltage downscaling is a trend in modern mobile/portable device design for reducing the power consumed by logic circuits, which is advantageous as more extended features and functionalities are provided, but it creates also a serious challenge for meeting the linearity requirement because of reduced voltage headroom for handling large interference signals. In the presence of interference, a receiver can be desensitized or even blocked if the linearity is poor and the interference is strong.

Radio receiver circuits normally comprise a low noise amplifier connected to an antenna and outputting an amplified signal with enough gain to a mixer circuit for providing a baseband signal. It is desirable for the radio receiver to have good linearity and low noise figure, and to achieve this, a sharp and narrow band pass filter is helpful in radio frequency as it attenuates unwanted interferences. When the number of defined radio bands in wireless radio systems increases, such as for the LTE, each radio band needs to be taken care of. One radio frequency narrow band pass filter implemented by acoustic devices, such as a SAW filter, cannot cover many bands because its inherent resonate frequency. Thus, the radio receiver circuit requires a plurality of filters in the front of low noise amplifier, preferably connected through switches. The insertion loss in the switches degrades the sensitivity of the receiver, and also the cost and area increase are issues. If the radio band pass filter can be made tunable, fewer filters are required. Unfortunately, tunable filters often have poor attenuation in stop bands, and this calls for better linearity in radio receiver front-end, and the unwanted interference signals can be suppressed by low pass filters after down-conversion in mixer. The radio receiver circuit should also be suitable for different conditions, e.g. different use or different signal conditions.

Biasing and filtering can be used for adapting to different signal conditions or uses. However, heavy biasing can be power consuming, and filters can be both expensive and space consuming. Where economic constraints in sense of energy, space and costs, the radio receiver circuit normally needs to be a compromise between the demands and the economic constraints. The designer of the radio receiver circuit then normally designs the circuitry for a worst signal case, which sets the energy consumption for any signal case. Similar applies for filters, mixers, analog-to-digital converters, etc. which may be a part of the radio receiver circuit.

It is therefore a desire to provide a radio receiver circuit capable of adaption.

SUMMARY

The present invention is based on the understanding that distribution of front end radio operation functionality provides for lower signals to be handled at each unit, and also this enables a versatility, e.g. depending on design, but also depending on a current signal condition of a radio frequency signal, as well as requirements on the receiver circuit. This is also based on the understanding that circuit technology, e.g. CMOS, now enables downscaling of each circuit unit and operation at low voltages, and also with low DC current consumption when not in operation.

According to a first aspect, there is provided a receiver circuit comprising a transformer arrangement comprising a transformer structure; multiple and distributed receiver units arranged to be connected to one and same antenna via the transformer arrangement and arranged to operate on the same frequency and bandwidth as each other, wherein the transformer arrangement is arranged to receive an antenna signal from the antenna and to output signals at different output ports for the respective receiver unit; and a combiner circuit arranged to combine outputs of the multiple receiver units with same phase such that the combiner circuit outputs a combined signal.

Each receiver unit may comprise a mixer circuit, wherein phase of an oscillator signal fed to an oscillator input of respective mixer circuit is adapted for the respective port of the transformer arrangement which the respective receiver unit is connected to such that the combiner circuit outputs a combined baseband signal as the combined signal.

Each receiver unit may comprise a low-noise amplifier, wherein the input of the respective low-noise amplifier is connected to the respective output port of the transformer arrangement.

The combiner may be arranged to provide an analog combined signal, and the receiver circuit further comprises an analog-to-digital converter arranged to convert the analog combined signal to a digital signal.

Each receiver unit may comprise an analog-to-digital converter arranged to convert an analog partial signal of each receiver unit to a digital partial signal, and the combiner is arranged combine the digital partial signals of the multiple receiver units to provide an combined digital signal as the combined signal.

The receiver circuit may further comprise a controller, wherein the controller is arranged to selectively disable or enable receiver units among the multiple receiver units according to a receiving condition.

Each radio unit may be configurable by disabling or enabling parts of circuitry arranged in parallel in radio unit.

Each radio unit may be configurable by a tunable bias voltage.

Each radio unit may be configurable by a tunable bandwidth of a low pass filter of the radio unit.

The transformer structure may be an autotransformer structure comprising a conductive element connected to receive the antenna input signal and the output ports are distributed along the conductive element.

The transformer structure may comprise a primary winding connected to receive the antenna input signal and a secondary winding having the output ports distributed along the secondary winding, i.e. an isolation transformer.

The distribution of the output ports may include that the output ports partly overlaps each other along their connection to the transformer structure, or the distribution of the output ports may include that the output ports are, along their connection to the transformer structure, distributed without any overlap.

Input transistors of respective receiver unit may be integrated with the transformer structure to form the connection to the transformer structure.

According to a second aspect, there is provided a method of controlling adaption of a receiver circuit comprising a transformer arrangement comprising a transformer structure, multiple receiver units arranged to be connected to one and same antenna via the transformer arrangement, wherein the transformer arrangement is arranged to input an antenna signal from the antenna and to output signals at different output ports for the respective receiver unit, and a combiner circuit arranged to combine outputs of the multiple receiver units such that the combiner circuit outputs a combined signal. The method comprises determining received signal conditions; and selectively disabling or enabling receiver units among the multiple receiver units based on the determined received signal conditions.

Where each receiver unit comprises a mixer circuit, the method may further comprise controlling a phase of an oscillator signal fed to respective one of the mixers.

Where each radio unit is configurable by parts of circuitry arranged in parallel in respective radio unit being configured to be disabled or enabled, the method may comprise controlling enabling and disabling of the paralleled parts of the circuitry.

Where each radio unit is configurable by a tunable bias voltage, the method may comprise controlling the bias voltage for each radio unit.

Where each radio unit is configurable by a tunable bandwidth of a low pass filter of the radio unit, the method may comprise controlling tuning of the bandwidth of the respective low pass filter.

According to a third aspect, there is provided a computer program comprising computer executable instructions which when executed by a programmable controller of a receiver circuit causes the controller to perform the method according to the second aspect.

According to a fourth aspect, there is provided a communication apparatus comprising a receiver circuit according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
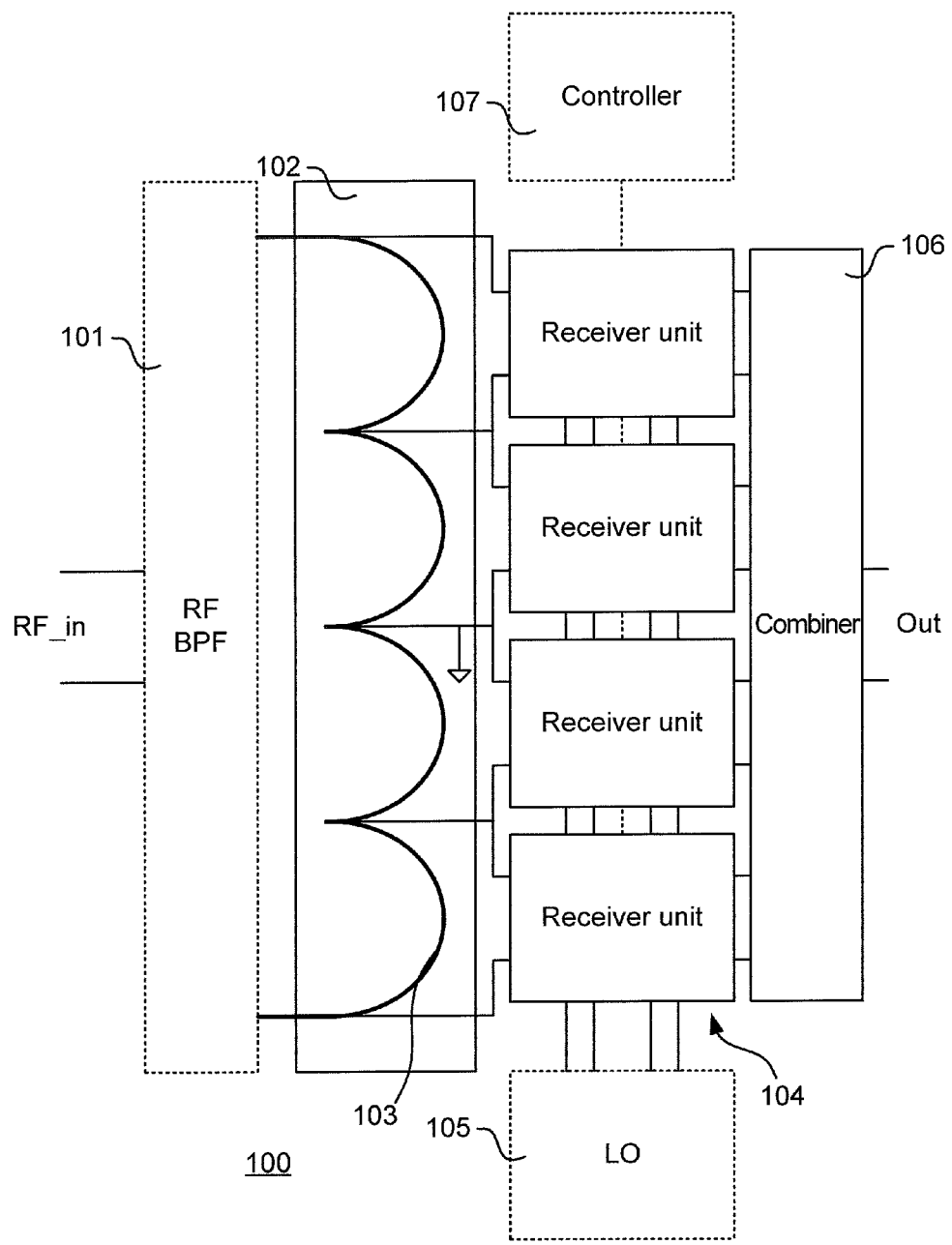
FIG. 1 schematically illustrates a receiver circuit according to an embodiment.

FIG. 1 schematically illustrates a receiver circuit 100 according to an embodiment. A radio frequency signal is input at node RF_in, e.g. from a single antenna, to the receiver circuit 100. The receiver circuit 100 can comprise a radio frequency bandpass filter 101 at the input for selecting a frequency band to receive, and also for attenuating transmitted signals from a transmitter collocated with the receiver such that transmitted signals is prevented from significantly reducing the receiver circuit performance. The signal is provided to a transformer arrangement 102 of the receiver circuit 100. The transformer arrangement 102 comprises an autotransformer structure, i.e. an electrical transformer with only one single winding, such as an inductor coil, or a micro strip, or a transmission line, etc., acting on itself where portions of the same winding act as both the primary and secondary of the transformer. As will be demonstrated below with reference to FIGS. 11 and 12, a traditional isolation transformer structure can also be used. The autotransformer comprises a multitude of taps along the winding, among which two input taps are provided with the input radio frequency signal. A plurality of receiver units 104 are connected to output taps of the autotransformer structure, where each receiver unit 104 is connected to an output port of the transformer arrangement 102. A centre tap of the autotransformer structure can also be connected to a reference voltage, such as ground or an AC ground node. Each receiver unit 104 is arranged to handle its portion of the radio frequency signal as the autotransformer splits the input power into small levels and thus relaxes the linearity requirement for each unit 104. Or expressed in other way, given that a receiver unit 104 can handle a power level $P_u$, then N receiver units, for example splitting power equally, will improve linearity about $10 \log_{10}(N)$ dB considering the factor of power splitting only. This distribution of receiver unit operation provides for lower signals to be handled at each receiver unit 104, and also to a versatility in selection of the number of receiver units 104 in operation, e.g. depending on design, but also depending on a current signal condition of the radio frequency signal. The interferences companied to the received RF signal can be filtered by respective low pass filter, which will be further elucidated below, without being further amplified to even larger level, so the frequency selectivity can be improved. The outputs of the receiver units 104 are then combined by a combiner circuit 106 which outputs a signal, e.g. a baseband signal, at the Out node out of the receiver circuit 100. Thus, the multiple and distributed receiver units 104 will work in parallel on the same frequency and bandwidth. The multiple and distributed receiver units 104 may need to work on different phases since they pick their input signal at different positions at the transformer arrangement 102.

Figure 2:
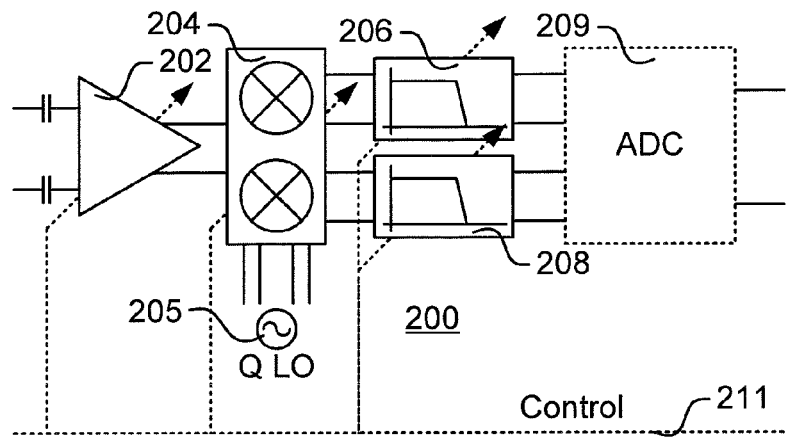
FIG. 2 schematically illustrates a receiver unit according to an embodiment.

FIG. 2 schematically illustrates a receiver unit 200 according to an embodiment. Each receiver unit 200, corresponding to receiver unit 104 as illustrated in FIG. 1, can comprise a low noise amplifier LNA 202, a mixer circuit 204, and a channel selection filter 206, 208, which each can be controlled in sense of amplification, mixing frequency and channel filter bandwidth, respectively, if needed. The control can be provided by a controller 107, as illustrated in FIG. 1, via one or more control lines 211. The LNA RF inputs are preferably AC coupled by capacitors so active transistors of the LNA 202 can be biased to different voltages, which also can be controlled via the control line 211. The effective transistor width can therefore be changed, i.e. by enabling or disabling the configurable branches of respective receiver unit or by enabling or disabling a set of receiver units, to reach a required linearity and/or signal-to-noise ratio SNR and keep the receiver circuit consuming less power, and also to adapt to input impedance at RF_in. The mixer 204 and the filters 206, 208 can be adapted in a similar way, which can reduce noise and/or boost gain and/or improve linearity in the receiver unit 200, e.g. when strong interference signals appear at the receiver input, or save power when the signal is strong. The bandwidth of the filters 206, 208 can also be changed or adapted according to the bandwidth of wanted radio frequency signals. The mixer circuit 204 is connected to clock signals, e.g. quadrature clock signals, provided by a local oscillator 205, which local oscillator 105 also is illustrated in FIG. 1. The local oscillator signal or signals are conventional, except that they are adapted to the different phase positions that the respective receiver unit 200 experience depending on which port of the transformer arrangement they are connected to. This adaption can be provided at the local oscillator, or at each receiver unit or the path to each receiver unit, e.g. by delay lines. This issue can also be taken care of at the combiner, as will be demonstrated below. As depicted in FIG. 2, the mixer circuit 204 can be arranged for quadrature mixing, wherein the channel selection filters 206, 208 are connected in each of I and Q branches. The receiver unit 200 can also comprise an analog-to-digital converter ADC 209 if the receiver unit 200 is intended to provide a digital output as a digital partial baseband signal. The combiner 106 in FIG. 1 is in such case a digital combiner. Otherwise, the receiver unit 200 outputs an analog partial signal, e.g. an analog partial baseband signal, to an analog combiner, wherein the output baseband signal from the combiner can be converted to digital domain after the combiner.

In short, enough gain is desired in e.g. LNA to reach required SNR, i.e. low noise to be able to receive a weak RF signal. The larger gain leads to larger signal amplitude which may drive the front end into nonlinear region, which in turn leads to poor linearity. Non-linearity in the receiver front-end will create more frequency components and some will be converted to interferences, which will desensitize the receiver, or even block the front-end. More advanced CMOS processes utilize lower device supply voltage due to thinner oxide between gate and channel, which also leads to small dynamic range in the front-end, which reduces the linearity capabilities at high interference. A single receiver unit may not meet the required gain, noise figure, and linearity at same time. A larger turn ratio of transformer to reduce the amplitude as to reach the linearity will get penalty due to the increased insertion loss. A paralleled/distributed front-end architecture may alleviate the linearity problem and get better SNR, but may consume a bit more power. This is solved by adaptive/re-configurable paralleled/distributed front-end architecture.

Returning to FIG. 1, the controller 105 can be arranged to selectably enable or disable receiver units among the set of receiver units 104 to adapt to a current signal condition. For example when the wanted signal has strong power level and the interference has low power level, fewer receiver units can be chosen to be active, e.g. to save power, while in the other way around, it can be good to have more or all receiver units active as to improve SNR and linearity. When an LNA 202 is disabled, the input of the disabled LNA will provide high impedance to the autotransformer which will reduce insertion loss by the disabled LNA. The input parasitic capacitance is thus very low and the real part of the impedance is close to infinity.

It is here noted that the real input impedance of the distributed receiver units may depend on the number of receiver units that are connected and enabled, and the turn ratio of the transformer arrangement, and the combined impedance of the enabled receiver units through the impedance mapping of the autotransformer is preferably adapted to match the input of the receiver circuit at RF_in node. Here, the term "turn ratio" stems from coil winding ratio between primary winding and secondary winding, mostly used for isolation transformers. In view of the autotransformer embodiments where the primary winding and the secondary winding can be considered to be merged together, it means the ratio between the input winding and the secondary winding, or for a lossless transformer the ratio between input voltage to the transformer and output voltage at respective output port to the respective receiver unit. The term "turn ratio" in view of the isolation transformer is evident, and the technical effect of the instances where the term is used is the same for both the autotransformer and the isolation transformer structures.

Figure 9:
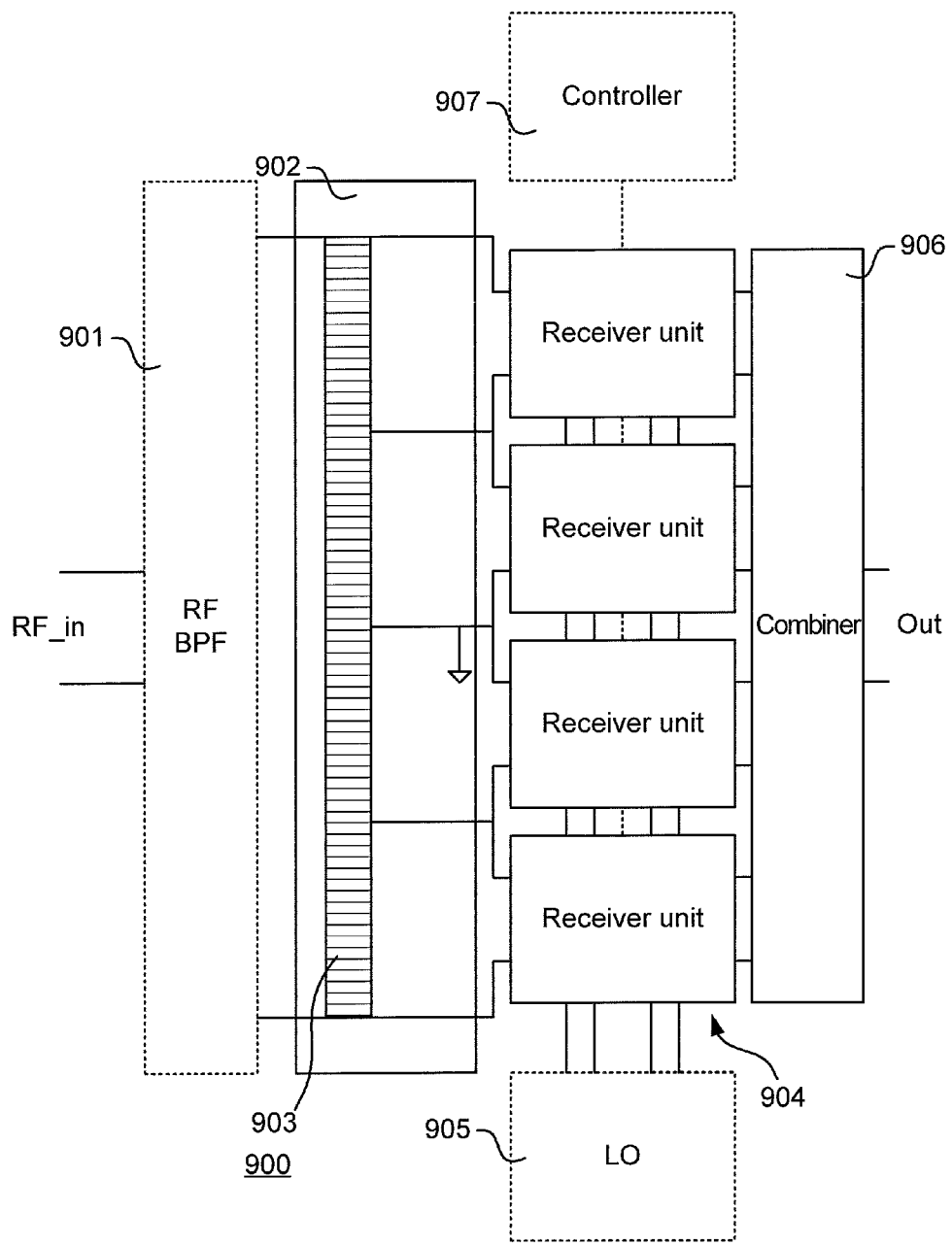
FIG. 9 schematically illustrates a receiver circuit according to an embodiment.

As FIG. 1 illustrates the principle for a receiver circuit of this disclosure, there can also be variants, as for example the receiver circuit 900 illustrated in FIG. 9 which is suitable for microwave frequencies. Here, the "winding" of the transformer arrangement 902 comprises a conductive strip 903 which provides significant inductance in the used frequency band to form the autotransformer structure. Similar as in FIG. 1, the receiver circuit 900 comprises a number of receiver units 904 and a combiner 906. The receiver circuit 900 can also comprise a radio frequency band pass filter 901, a local oscillator 905, and/or a controller 907.

Figure 10:
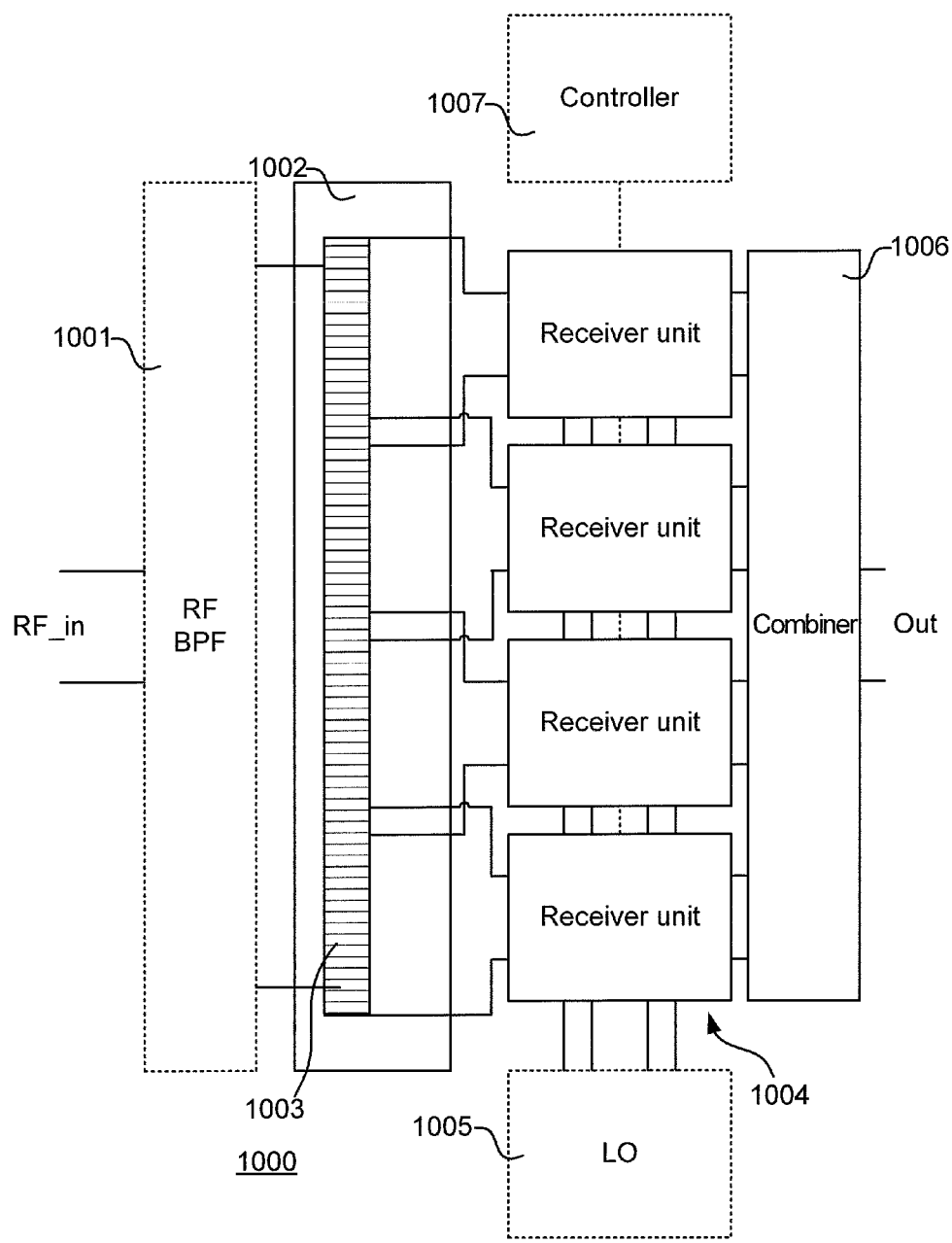
FIG. 10 schematically illustrates a receiver circuit according to an embodiment.

Another alternative is illustrated in FIG. 10, where the ports towards the receiver units 1004 overlap along the winding or strip 1003 of the transformer arrangement 1002. Here, a strip 1003 is illustrated, but the principle of overlapping ports is equally applicable to a traditional winding. Similar as in FIG. 1, the receiver circuit 1000 comprises a number of receiver units 1004 and a combiner 1006. The receiver circuit 1000 can also comprise a radio frequency band pass filter 1001, a local oscillator 1005, and/or a controller 1007.

Figure 11:
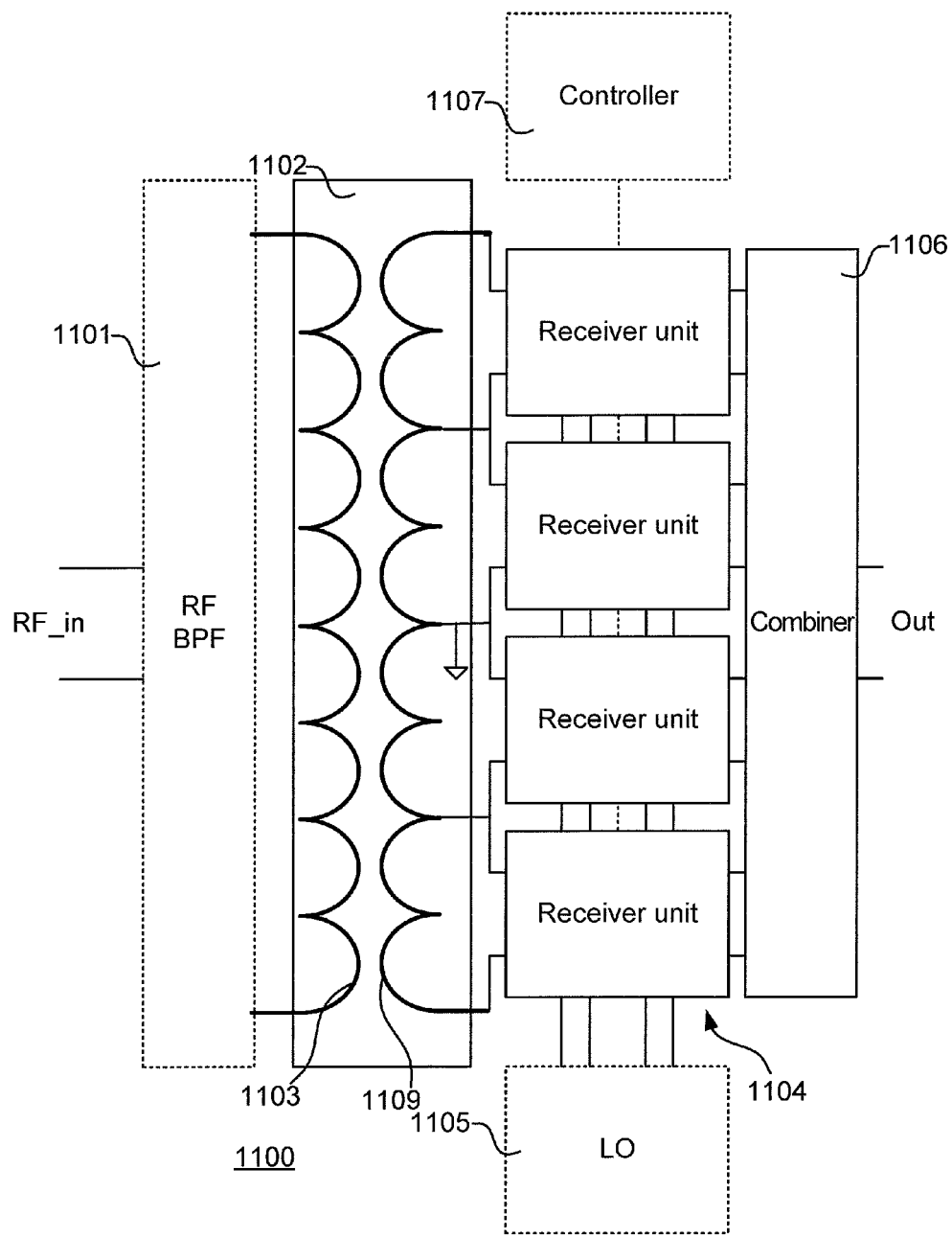
FIG. 11 schematically illustrates a receiver circuit according to an embodiment.

A further alternative is illustrated in FIG. 11, where the transformer structure 1102 comprises an isolation transformer with a primary winding 1103 connected to receive the (filtered) antenna signal RF_in and a secondary winding 1109 to which the output ports towards the receiver units are connected. Similar as in FIG. 1, the receiver circuit 1100 comprises a number of receiver units 1104 and a combiner 1106. The receiver circuit 1100 can also comprise a radio frequency band pass filter 1101, a local oscillator 1105, and/or a controller 1107.

Figure 12:
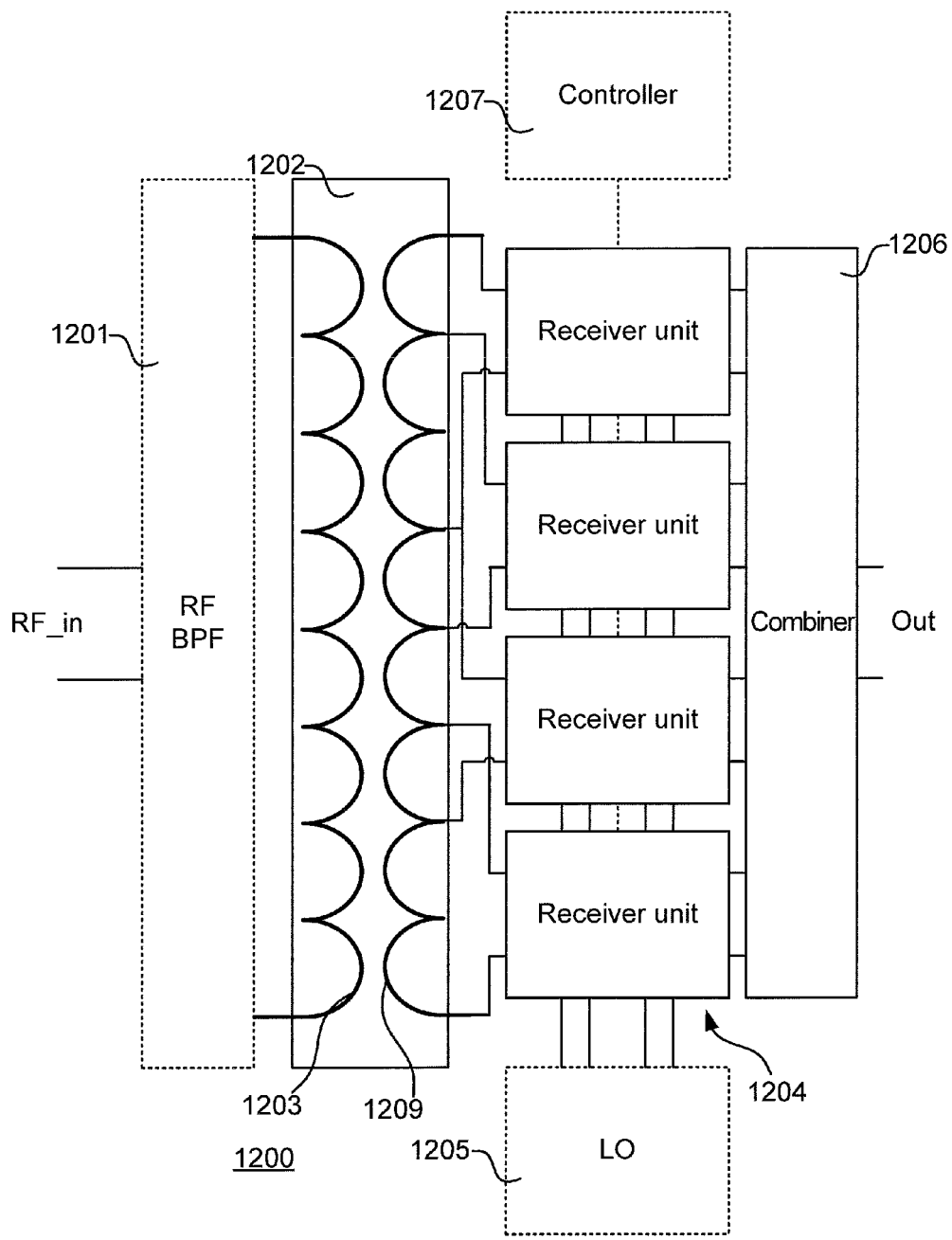
FIG. 12 schematically illustrates a receiver circuit according to an embodiment.

Still a further alternative is illustrated in FIG. 12, where the transformer structure 1202 comprises an isolation transformer with a primary winding 1203 connected to receive the (filtered) antenna signal RF_in and a secondary winding 1209 to which the output ports towards the receiver units are connected. Further, the ports towards the receiver units 1204 overlap along the secondary winding 1209 of the transformer arrangement 1202. Similar as in FIG. 1, the receiver circuit 1200 comprises a number of receiver units 1204 and a combiner 1206. The receiver circuit 1200 can also comprise a radio frequency band pass filter 1201, a local oscillator 1205, and/or a controller 1207.

Figure 3:
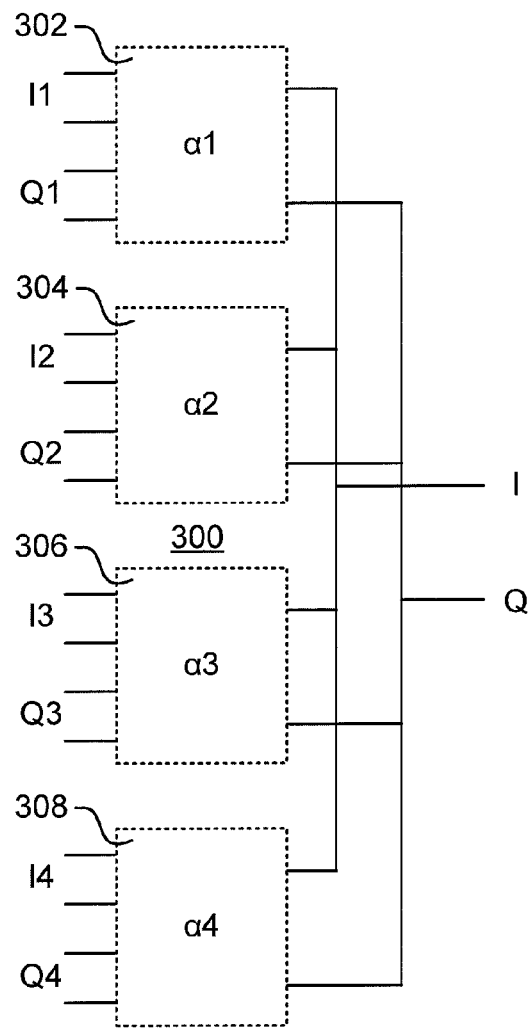
FIG. 3 illustrates a combiner according to an embodiment.

FIG. 3 illustrates a combiner 300 according to an embodiment. Local oscillator skew and phase shift in the autotransformer can influence the phase of down-converted baseband signals, when the down-converted partial baseband signals are combined, the signal quality of the combined baseband signal can in such cases be degraded. This can as indicated above be combated by controlling clock skew and phase shift at design of the circuit such that all partial baseband signals will have the same phase. In practice, however, this may not be perfect, and particularly not for all frequencies if the receiver circuit is intended for use in a wide band. The phase errors can be reduced by a phase rotation, here expressed as a phase rotation matrix operation $$BBo = \begin{bmatrix} I \\ Q \end{bmatrix} = \sum_i \alpha_i BB_i \text{ and } \alpha_i = \begin{bmatrix} a_i, c_i \\ b_i, d_i \end{bmatrix}, BB_i = \begin{bmatrix} I_i \\ Q_i \end{bmatrix},$$

where BBo is the output to the baseband circuit, BBi is partial baseband signal i from receiver unit i, and $\alpha_i$ is the phase rotation matrix. This can be done in either analog or digital domain, or a combination thereof. It can be adapted to for example signal quality, e.g. maximizing signal-to-noise ratio of the combined baseband signal, i.e. $SNR_{max} = max_\alpha SNR(\alpha)$ is maximized. The output signals I1, Q1, I2, Q2, I3, Q3, I4, Q4 from the respective receiver units are provided to phase rotators 302, 304, 306, 308 where the found phase rotation matrices are applied, respectively, such that a phase aligned output can be combined.

Figure 4:
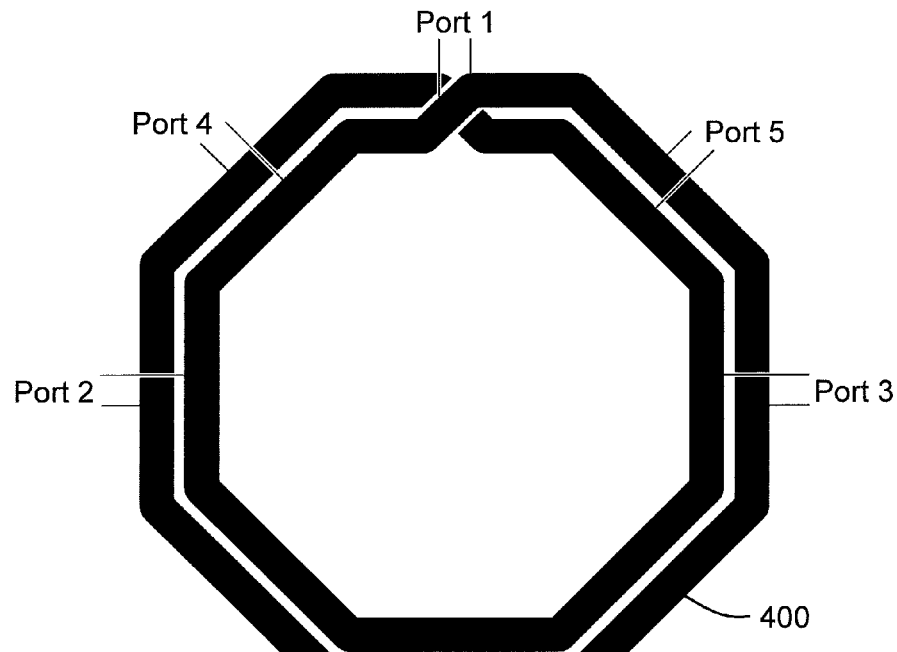
FIG. 4 illustrates an example of a transformer arrangement according to an embodiment.

FIG. 4 illustrates a transformer arrangement 400 according to an embodiment. The transformer arrangement 400 is suitable for a differential RF input, and is provided with five ports each arranged for connection to a receiver unit. It is advantageous if the ports are symmetrically distributed along the winding, and upon enabling or disabling receiver units, this is preferably also taken into account. For example if the received signal is strong and interference is weak, only the receiver unit connecting to Port 1 is enabled, while if the received signal is weak and the interference is strong, all receiver units at Ports 1 to 5 are enabled, and for a less extreme signal condition receiver units at Ports 1, Port 2, and Port 3 are enabled while receiver units at Port 4 and Port 5 are disabled. Symmetrical configurations can be helpful to suppress the even order nonlinear distortion.

Figure 5:
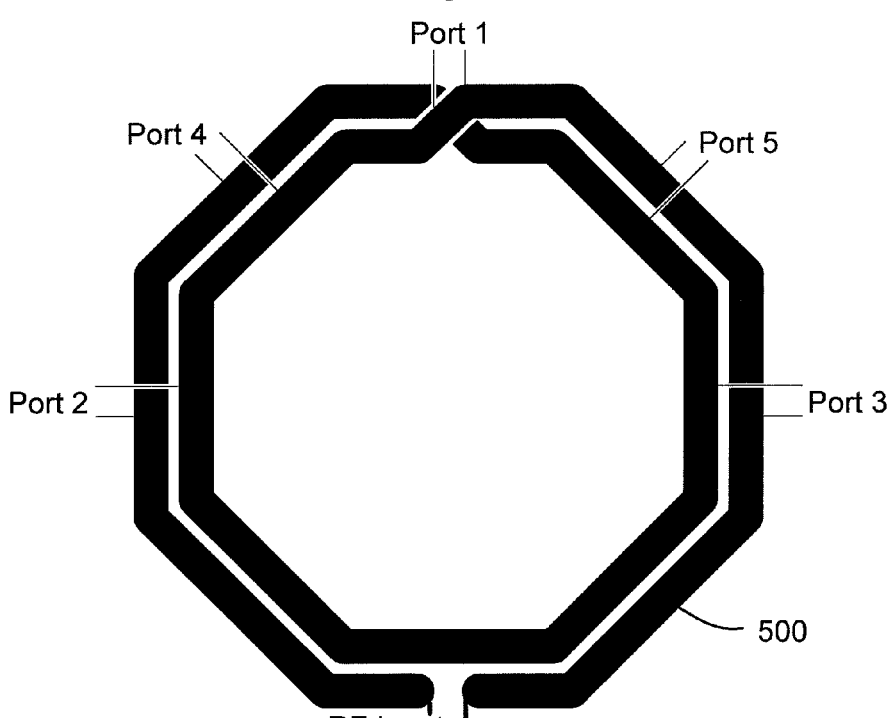
FIG. 5 illustrates a an example of a transformer arrangement according to an embodiment.

FIG. 5 illustrates a transformer arrangement 500 according to an embodiment. The transformer arrangement 500 is suitable for a single-ended RF input, but is in other senses similar to the one demonstrated with reference to FIG. 4. Thus, the approach in this disclosure is as applicable to both single-ended solutions and differential solutions.

Figure 6:
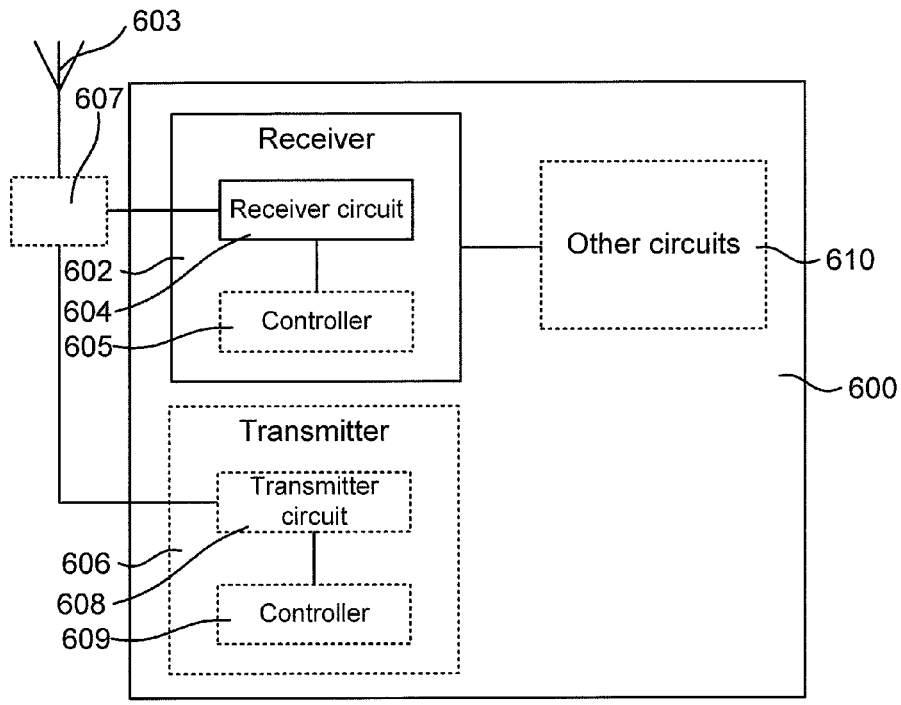
FIG. 6 is a block diagram schematically illustrating a communication apparatus according to an embodiment.

FIG. 6 is a block diagram schematically illustrating a communication apparatus 600 according to an embodiment. The communication apparatus 600 can be capable of two-way communication, e.g. with a communication network or other an apparatus capable of two-way communication. The communication apparatus 600 can comprise a transceiver arrangement including a transmitter 606 with a transmitter circuit 608, possibly controlled by a transmitter controller 609. The transceiver arrangement also comprises a receiver 602 which comprises a receiver circuit 604 according to any of the above demonstrated embodiments, which can be controlled by a controller 605 as demonstrated above. The communication apparatus 600 can also be for receiving only comprising the receiver 602 which comprises a receiver circuit 604 according to any of the above demonstrated embodiments, which can be controlled by a controller 605 as demonstrated above. The transceiver arrangement or receiver 602 is connected to an antenna 603 through an antenna port 607 which can be a duplexer or SAW filter, etc. The communication apparatus 600 can also comprise other circuits 610, such as interface towards a user and/or other circuitry or machines, memory, processor, etc. The communication apparatus 600 can be a smartphone or cellphone, a communication card or device in or for a computer, an embedded communication device in a machine, or the like. The communication apparatus 600 can be adapted for cellular communication, point-to-point communication, receiving signals for determining position, or for communication in a wireless or wired network.

The antenna port described above need not necessarily by connected to an antenna, but can equally be connected to a wired line which conveys radio frequency signals. Thus, the communication apparatus 600 described with reference to FIG. 10 need not comprise the antenna 603 wherein the communication apparatus 600 is instead connected to such a wired line conveying radio frequency signals.

Figure 7:
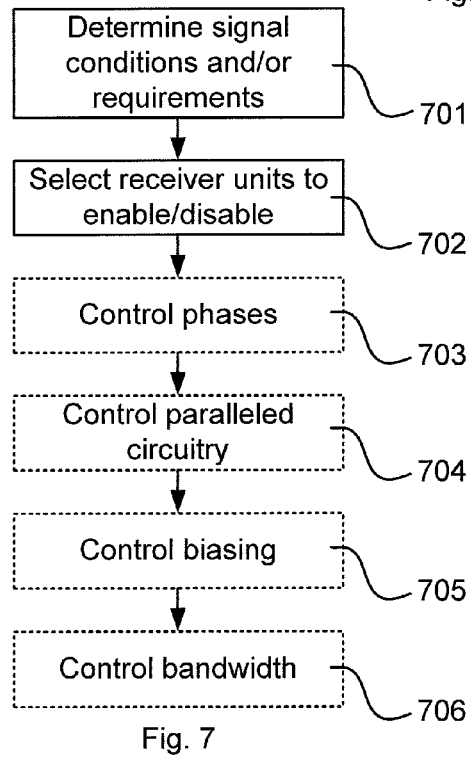
FIG. 7 is a flow chart illustrating methods according to embodiments.

FIG. 7 is a flow chart illustrating methods according to embodiments. The method is for controlling a receiver circuit as of the embodiments demonstrated above. Signal conditions and/or other requirements are determined 701. Signal conditions can include signal strength, interference, distortion, etc., which can be determined in a traditional way on the input and/or output signals. The other requirements can be assigned bandwidth, allowed or preferred power consumption, allowed interference and/or distortion, etc. The assigned bandwidth is normally known by a communication device either by default (design) setting or by assignment agreed with a telecommunication system in higher layers. Allowed or preferred power consumption can also be provided from higher layers, e.g. by different power save modes, or by design, e.g. based on available power supply. Interference and/or distortion can in a similar way also be accepted in different levels based on higher layer settings or by design considerations. The general approach is to trade these parameters to each other to reach a favourable compromise, e.g. as to reach a required linearity and signal-to-noise ratio, and to keep the receiver circuit power consumption as low as possible. This can be made in a more or less complex way, which also is dependent on required versatility of the receiver circuit. If low or no versatility is required, all or most of the considerations can be made at design and for example only signal conditions form part for steps 702-706, which will be discussed below, but if great versatility is required, the considerations are preferably performed by a controller, and preferably by a programmable digital controller as is demonstrated below. Based on the determination, for example as demonstrated above, one or more receiver unit among the multiple receiver units is/are selectively enabled or disabled 702. Optionally, the method includes controlling 703 phase of an oscillator signal fed to respective one of the mixers as demonstrated above and/or controlling 703 a phase rotation at combining for each of the receiver units. Where each receiver unit is configurable by parts of circuitry arranged in parallel in respective receiver unit, the parts are configured to be disabled or enabled, as discussed above. The method can comprise controlling 704 enabling and disabling of paralleled parts of the receiver units, which will be further discussed with reference to FIG. 13. Where each radio unit is configurable by tunable bias voltage, as also discussed above, the method can comprise controlling 705 bias voltage for each receiver unit. Similar, where each receiver unit is configurable by a tunable bandwidth of a low pass filter of the radio unit, as also discussed above, the method can comprise controlling 706 tuning of the bandwidth of the respective low pass filter. Since high bandwidth consumes more power than low bandwidth, power can be saved by this adaption too. The controlling can roughly be said to be inclined to reduce power consumption, e.g. by fewer radio units active, lower bias, lower bandwidth, etc., as long as linearity is good enough for handling interference, distortion, etc. as required for the radio receiver, e.g. based on provided service.

Figure 13:
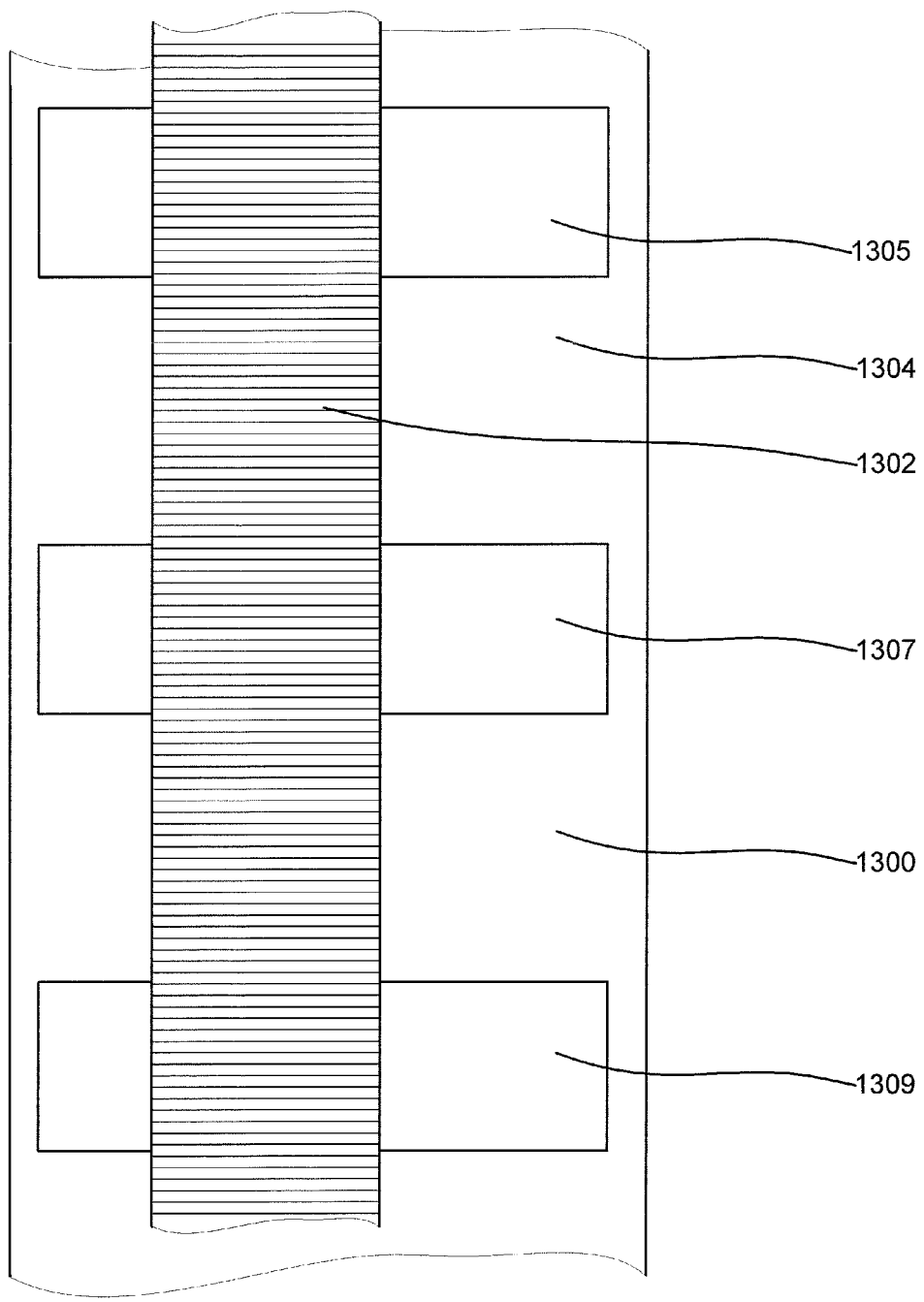
FIG. 13 schematically illustrates a detail of a receiver circuit according to an embodiment.

FIG. 13 illustrates a detail 1300 of a receiver circuit according to an embodiment, where the (secondary) winding or strip 1302 is integrated with at least input transistors of respective receiver unit. This is particularly advantageous when a great multitude of receiver units, and/or paralleled parts of receiver units, are used, and downscaling can be fully utilised. Thus, along the winding or strip 1302, respective gate elements 1305, 1307, 1309 are arranged on a substrate 1304, which holds the rest of the elements (not shown) of the respective input transistors. Input capacitors can also be integrated in a similar way, i.e. to AC-couple the signal from the winding or strip 1302 to the respective gate elements 1305, 1307, 1309. A great multitude of output ports can thus be formed without consuming much chip space. Enabling/disabling of selected set of output ports among the great multitude of output ports is performed in a similar way as discussed above.

Figure 8:
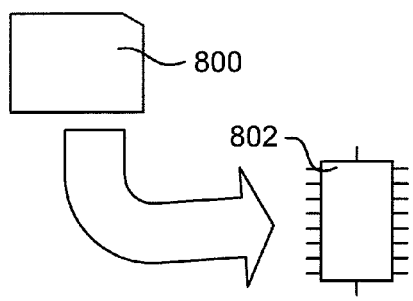
FIG. 8 schematically illustrates a computer program and a processor for implementing the method.

The methods according to the present invention are suitable for implementation with aid of processing means, such as controllers and/or processors, especially for the case where the receiver circuit is controller and/or processor and/or computer controlled. Therefore, there is provided computer programs, comprising instructions arranged to cause the processing means, processor, or computer to perform the steps of any of the methods according to any of the embodiments described with reference to FIG. 7. The computer programs preferably comprises program code which is stored on a computer readable medium 800, as illustrated in FIG. 8, which can be loaded and executed by a processing means, processor, or controller 802 to cause it to perform the methods, respectively, according to embodiments of the present invention, preferably as any of the embodiments described with reference to FIG. 7. The controller 802 and computer program product or special software 800 can be arranged to execute the program code sequentially where actions of the any of the methods are performed stepwise. The processing means, processor, or controller 802 is preferably what normally is referred to as an embedded system. Thus, the depicted computer readable medium 800 and controller 802 in FIG. 8 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A receiver circuit comprising:
    a transformer arrangement comprising a transformer structure;
    multiple and distributed receiver units arranged to be connected to one and same antenna via the transformer arrangement and arranged to operate on the same frequency and bandwidth as each other, wherein the transformer arrangement is arranged to receive an antenna signal from the antenna and to output signals at different output ports for the respective receiver unit, wherein each of the output signals at the different output ports has a lower signal power level than a signal power level of the antenna signal; and
    a combiner circuit arranged to combine outputs of the multiple receiver units with same phase such that the combiner circuit outputs a combined signal.

2. The receiver circuit of claim 1, wherein each receiver unit comprises a mixer circuit, wherein a phase of an oscillator signal fed to an oscillator input of respective mixer circuit is adapted for the respective port of the transformer arrangement which the respective receiver unit is connected to such that the combiner circuit outputs a combined baseband signal as the combined signal.

3. The receiver circuit of claim 1, wherein each receiver unit comprises a low-noise amplifier, wherein the input of the respective low-noise amplifier is connected to the respective output port of the transformer arrangement.

4. The receiver circuit of claim 1, wherein the combiner is arranged to provide an analog combined signal, and the receiver circuit further comprises an analog-to-digital converter arranged to convert the analog combined signal to a digital signal.

5. The receiver circuit of claim 1, wherein each receiver unit further comprises an analog-to-digital converter arranged to convert an analog partial signal of each receiver unit to a digital partial signal, and the combiner is arranged to combine the digital partial signals of the multiple receiver units to provide an combined digital signal as the combined signal.

6. The receiver circuit of claim 1, further comprising a controller, wherein the controller is arranged to selectively disable or enable receiver units among the multiple receiver units according to a receiving condition.

7. The receiver circuit of claim 1, wherein each radio unit is configurable by disabling or enabling parts of circuitry arranged in parallel in the radio unit.

8. The receiver circuit of claim 1, wherein each radio unit is configurable by a tunable bias voltage.

9. The receiver circuit of claim 1, wherein each radio unit is configurable by a tunable bandwidth of a low pass filter of the radio unit.

10. The receiver circuit of claim 1, wherein the transformer structure is an autotransformer structure comprising a conductive element connected to receive the antenna input signal and the output ports are distributed along the conductive element.

11. The receiver circuit of claim 1, wherein the transformer structure comprises a primary winding connected to receive the antenna input signal and a secondary winding having the output ports distributed along the secondary winding.

12. The receiver circuit of claim 10, wherein the distribution of the output ports includes that the output ports partly overlaps each other along their connection to the transformer structure.

13. The receiver circuit of claim 10, wherein the distribution of the output ports includes that the output ports are, along their connection to the transformer structure, distributed without any overlap.

14. The receiver circuit of claim 10, wherein input transistors of respective receiver unit are integrated with the transformer structure to form the connection to the transformer structure.

15. A method of controlling adaption of a receiver circuit comprising a transformer arrangement comprising a transformer structure; multiple receiver units arranged to be connected to one and same antenna via the transformer arrangement, and arranged to operate on the same frequency and bandwidth as each other wherein the transformer arrangement is arranged to input an antenna signal from the antenna and to output signals at different output ports for the respective receiver unit, and wherein each of the output signals at the different output ports has a lower signal power level than a signal power level of the antenna signal; and a combiner circuit arranged to combine outputs of the multiple receiver units such that the combiner circuit outputs a combined signal, the method comprising:
  determining received signal conditions; and
  selectively disabling or enabling receiver units among the multiple receiver units based on the determined received signal conditions.

16. The method of claim 15, wherein each receiver unit comprises a mixer circuit, the method further comprising controlling a phase of an oscillator signal fed to respective one of the mixers.

17. The method of claim 15, wherein each radio unit is configurable by parts of circuitry arranged in parallel in respective radio unit being configured to be disabled or enabled, wherein the method comprises controlling enabling and disabling of the paralleled parts of the circuitry.

18. The method of claim 15, wherein each radio unit is configurable by a tunable bias voltage, wherein the method comprises controlling the bias voltage for each radio unit.

19. The method of claim 15, wherein each radio unit is configurable by a tunable bandwidth of a low pass filter of the radio unit, wherein the method comprises controlling tuning of the bandwidth of the respective low pass filter.

20. A nontransitory computer-readable storage medium comprising computer executable instructions which, when executed by a programmable controller of a receiver circuit, causes the controller to perform a method of controlling adaption of the receiver circuit, wherein the receiver circuit comprises a transformer arrangement comprising a transformer structure; multiple receiver units arranged to be connected to one and same antenna via the transformer arrangement, and arranged to operate on the same frequency and bandwidth as each other wherein the transformer arrangement is arranged to input an antenna signal from the antenna and to output signals at different output ports for the respective receiver unit, and wherein each of the output signals at the different output ports has a lower signal power level than a signal power level of the antenna signal; and a combiner circuit arranged to combine outputs of the multiple receiver units such that the combiner circuit outputs a combined signal, the method comprising:
  determining received signal conditions; and
  selectively disabling or enabling receiver units among the multiple receiver units based on the determined received signal conditions.

21. A communication apparatus comprising a receiver circuit according to claim 1.

* * * * *